United States Patent [19]

Harada et al.

[11] Patent Number: 4,800,476
[45] Date of Patent: Jan. 24, 1989

[54] PWM INVERTER WITH A SATURABLE CORE

[75] Inventors: Koosuke Harada; Hiroshi Sakamoto, both of Fukuoka, Japan

[73] Assignee: Nishimu Electronics Industries Co., Inc., Fukuoka, Japan

[21] Appl. No.: 95,399

[22] Filed: Sep. 10, 1987

[51] Int. Cl.⁴ .......................................... H02M 3/335
[52] U.S. Cl. ........................................ 363/16; 363/75; 363/132; 363/134; 323/290
[58] Field of Search ....................... 363/16, 17, 24–26, 363/75, 97–98, 131–134; 323/282, 290

[56] References Cited

U.S. PATENT DOCUMENTS

| | | | |
|---|---|---|---|
| 3,593,109 | 7/1971 | Wellford | 363/132 |
| 4,039,921 | 8/1977 | Yoshida et al. | 363/17 |
| 4,187,458 | 2/1980 | Milberger et al. | 323/290 |
| 4,348,598 | 9/1982 | Smith | 323/290 |
| 4,680,534 | 7/1987 | Tanaka et al. | 323/290 |

Primary Examiner—Peter S. Wong
Attorney, Agent, or Firm—Kinney & Lange

[57] ABSTRACT

A PWM inverter including a saturable core and a main circuit comprising a series circuit of a main winding and a resistor in which switching means applies a DC voltage across the main circuit by time ratio control with the polarity inverted alternately, and the on-off control of the switching means is accomplished by using a saturable transformer with a saturable core.

11 Claims, 3 Drawing Sheets

PWM INVERTER WITH A SATURABLE CORE

BACKGROUND OF THE INVENTION

1. Field of the Invention

This invention relates to a PWM inverter for obtaining a PWM (pulse-width-modulated) rectangular wave from a DC power source by time ratio control, and more particularly, to a PWM inverter having switching means to apply a DC voltage across a main circuit, comprising a series circuit of a main winding and a resistor, by time ratio control with the polarity of the applied voltage inverted alternately.

More specifically, this invention relates to a PWM inverter that accomplishes on-off control of the aforementioned switching means by a saturable transformer using a saturable core.

2. Description of the Prior Art

In the conventional switching power source which obtains a sinusoidal (AC) output or a stabilized DC output from a DC power source by time ratio control of switch elements, control of changeover of the aforementioned switch elements has been based on generating a pulse-width-modulated control signal of a constant frequency by a PWM controller. Such a controller is constructed by electronic circuit components such as integrated circuits, etc. The power of this control signal is amplified through use of electronic circuit based semiconductor elements, etc. The on-off operation of the switch elements is directed by this amplified control signal (see B. D. Bedford et al: Principles of Inverter Circuits (1964) pp 310-313, John Wiley & Sons, Inc.).

As a result, the conventional unit has the disadvantages that not only the construction of the PWM controller and the switch element drive circuit is complex but also the power loss of the switch element drive circuit increases when the switching frequency is increased.

SUMMARY OF THE INVENTION

This invention uses a saturable transformer, including a saturable core, for the PWM controller to overcome these problems, and its object is to provide a PWM inverter which is extremely simple in its circuit configuration, with small power loss in the switch elements and its drive circuit.

Another object of this invention is to provide a PWM inverter having a main circuit comprising a series circuit of a main winding and a resistor, and having a semiconductor switch means which applies a DC voltage across this main circuit by time ratio control with the polarity inverted.

Still another object of this invention is to provide a PWM inverter designed for on-off control of the aforementioned semiconductor switch means by a saturable transformer using a saturable core.

DETAILED DESCRIPTION OF THE PREFERRED EMBODIMENTS

Figure 1:
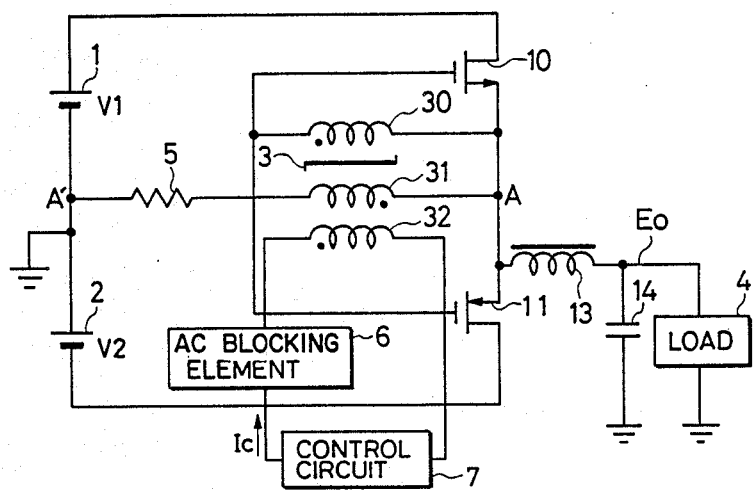
FIG. 1 is a circuit diagram showing an embodiment of this invention.

FIG. 1 is a circuit diagram showing an embodiment of this invention. In this figure, half-bridge complementary FETs 10 and 11 are connected in series to the two DC power sources 1 and 2 which are connected in series. The connecting point of the two DC power sources 1 and 2 is grounded to the ground potential. The sources and gates of both FETs are connected in common respectively.

The saturable core 3 is wound with a drive winding 30, a main winding 31 and a control winding 32. The drive winding 30 is connected between the gates and sources of FET 10 and FET 11, while the main circuit, comprising a series circuit of the main winding 31 and the resistor 5, is connected between the sources of the FET 10 and FET 11 and ground. The control winding 32 is connected to a control circuit 7 through an AC blocking element such as a high value resistor, a choke or other suitable device to block control circuit frequencies other than desired ones such as in a selected sinusoidal current signal as described below. The polarity of each winding is indicated with a black spot.

A load 4 is connected to circuit node A, which is the connecting point of the sources of the FETs, through a reactor 13, and a capacitor 14 is connected to the load 4 in parallel. As mentioned later, FETs 10 and 11 are so controlled that when one is turned on, the other is turned off.

Figure 2:
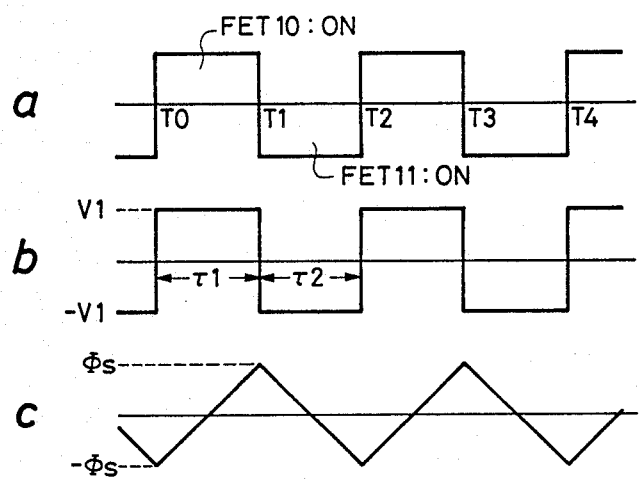
FIGS. 2 and FIG. 3 are the waveform time charts describing the operation of the PWM inverter shown in FIG. 1.

At time T0 to T1 when FET 10 is turned on and FET 11 is turned off as shown in FIG. 2-a, the voltage V1 of the DC power source 1 is applied to the main winding 31 through the resistor 5 (waveform b in FIG. 2) during operation, and the magnetic flux in the core 3 is increased by the time integral of the voltage applied to the main winding 31, as shown in FIG. 2-c. Here, it is assumed that the current Ic of the control winding 32 is substantially zero. Also, the turn-on state of the FET 10 is held by the voltage induced in the drive winding 30.

If the magnetic flux in the core 3 reaches the saturation value $\Phi s$ at time T1, the inductance of the main winding 31 decreases abruptly. This leads to the current of the drive winding 30 and the voltage between the gate and source of the FET 10 exhibiting transient oscillation because of the capacitance between the gate and source of the FET 10 and the saturated inductance of the drive winding 30. As a result, a pulse current flows from the gate of the FET 10 to the drive winding 30 and the electric charge stored in the capacitance between the gate and source of the FET 10 is discharged rapidly, causing the FET 10 to be turned off.

When the FET 10 is so turned off, the energy stored in the core 3 is applied as a current to the capacitance between the gate and source of the FET 11 by the transient current flowing in the drive winding 31. As a result, the gate voltage of FET 11 becomes a forward bias and the FET 11 is turned on. When the FET 11 is turned on, the voltage V2 of the DC power source 2 is applied to the main winding 31 through the resistor 5.

The magnetic flux in the core 3 decreases from the positive saturation value $\Phi s$ as shown in FIG. 2-c according to the time integral of the voltage applied to the main winding 31 in the same manner as mentioned above. When the magnetic flux reaches a negative saturation value $-\Phi s$ at time T2, the FET 11 is turned off and the FET 10 is turned on by the same mechanism as described earlier, that is, commutation from the FET 11 to the FET 10 takes place. This commutation is repeated at a predetermined period thereafter.

As mentioned earlier, commutation from one FET to the other FET in the circuit shown in FIG. 1 is caused by the transient oscillation current due to the series circuit of the capacitance between the gate and source of each FET and the saturated inductance of the core 3, but the capacitance between the gate and source is so small in some types of FETs that commutation may not easily take place. In such cases, commutation can be achieved more easily by adding a capacitor between the gate and source of the FET.

Next, the principle of time ratio control in this invention is described. As is clear from the foregoing description in which FIG. 2 is referred to, times $\tau 1$ and $\tau 2$ for which each FET 10 and 11 is turned on depend on the voltage applied to the main winding 31. Therefore, if the exciting current of the core 3 is negligibly small and the control current Ic from the control circuit 7 is zero, and if the voltage V1 of the DC power source 1 and the voltage V2 of the DC power source 2 are equal, then time $\tau 1$ for which the FET 10 is turned on and the time $\tau 2$ for which the FET 11 is turned on become equal. The output waveform then produced at point A, that is, the voltage waveform across the main circuit comprising a series circuit of the resistor 5 and the main winding 31, becomes a rectangular waveform of which positive period and negative period are congruent, like the waveform shown in FIG. 2-b.

If the exciting current is negligibly small (generally, with a saturable core, the exciting current can be ignored), the sum of the products (i.e., ampere-turns) of the number of turns of each winding wound around the core 3 and the current flowing in each of the windings 30 through 32 becomes zero. Also the impedance between the gates and sources of the FETs 10 and 11 is so high that almost no current flows in the drive winding 30. Thus the current Is flowing in the main winding 31 may be expressed as follows.

$$Is = -Nc \cdot Ic/Ns$$

where Nc and Ns are the number of turns of the control winding 32 and the main winding 31 respectively.

Therefore, if a control current Ic is applied from the control circuit 7 in the direction shown in FIG. 1, the main winding 31 will be energized with a current which is a function of the control current Ic, causing a voltage drop Vr across the resistor 5.

Figure 3:
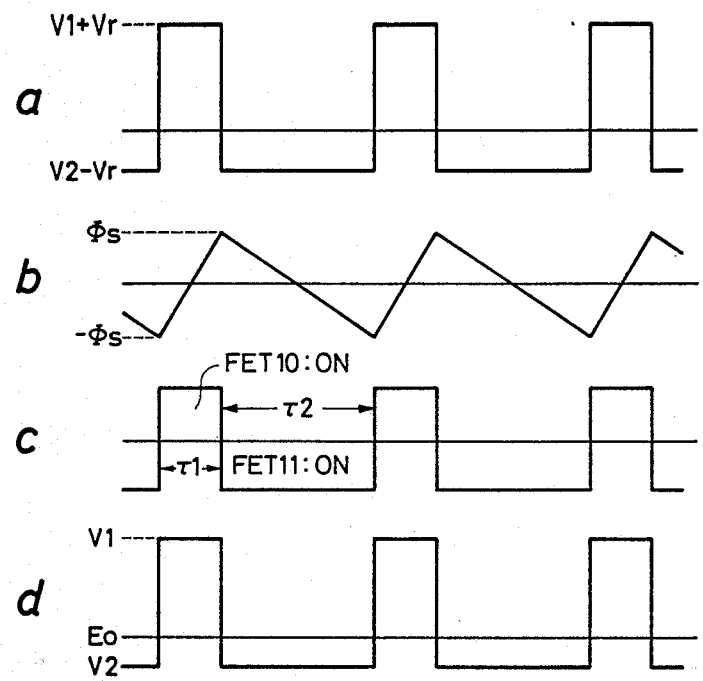

It is easily understood that a voltage which is the sum of the voltage V1 of the DC power supply 1 and the voltage Vr across the resistor 5 is applied to the winding 31 when the FET 10 is turned on, while a difference voltage, which is the voltage V2 (=V1) of the DC power source 2 less the voltage Vr across the resistor 5, is applied to winding 31 when the FET 11 is turned on. This state is shown in FIG. 3-a. Here, the magnetic flux in the core 3 changes as shown in FIG. 3-b. Thus the time $\tau 1$ for which the FET 10 is turned on and the time $\rho 2$ for which the FET 11 is turned on change as shown in FIG. 3-c.

Given that V1 and V2 are the voltages of the DC power sources 1 and 2 respectively, Ns and Nc the numbers of turns of the main winding 31 and the control winding 32, $\Phi s$ the saturation magnetic flux of the core 3, R the resistance value of the resistor 5, and Ic the control current applied by the control circuit 7, the aforementioned turn-on times T1 and T2 may be expressed by the following formulae respectively.

$$T1 = 2\Phi s \cdot Ns / \{V1 + (Vc \cdot R \cdot Nc)/Ns\}$$

$$T2 = 2\Phi s \cdot Ns / \{V1 - (Vc \cdot R \cdot Nc)/Ns\}$$

These formulae indicate that the time ratio T1/(T1+T2) between the FET 10 turn-on time and the FET 11 turn-on time can be easily controlled with the control current Ic.

In FIG. 1, a PWM rectangular wave such as shown in FIG. 3-d is generated between the connecting node A of the sources of the FET 10 and 11 and the ground node A', as is clear from the above explanation. As shown in FIG. 1, the voltage Eo which is the average value of the waveform in FIG. 3-d can be obtained across the capacitor 14 by connecting one terminal of the reactor 13 to node A and grounding the other terminal with a capacitor 14. The load 4 is connected to both ends of the capacitor 14.

Assuming that the voltages of the DC power sources 1 and 2 are both V1, the aforementioned average value, that is, the output voltage Eo may be expressed by the following formula.

$$\begin{aligned} Eo &= (\tau 1 - \tau 2)V1/(\tau 1 + \tau 2) \\ &= R \cdot Ic \cdot Nc/Ns \end{aligned}$$

As can be seen from this formula, in the circuit shown in FIG. 1, the output voltage Eo is proportional to the control current Ic and it does not change with the voltage V1 of the DC power sources 1 and 2.

As is also obvious, if the control circuit 7 is operated so that the control current Ic becomes constant, the output voltage will also become constant and, if the current Ic is changed like a sinusoidal wave, a sinusoidal wave output voltage can be obtained.

In order to obtain a more accurate sinusoidal wave (AC) output with the embodiment circuit shown in FIG. 1, it is desirable to obtain a rectangular wave output voltage which is pulse width modulated to a sinusoidal wave, at node A, by detecting and amplifying the deviation of the output voltage from the reference voltage of the sinusoidal wave, and then controlling the current Ic to be applied to the control winding 32 with the amplified deviation signal in the control circuit 7, still smoothing the rectangular wave output voltage by the reactor 13 and the capacitor 14.

Figure 4:
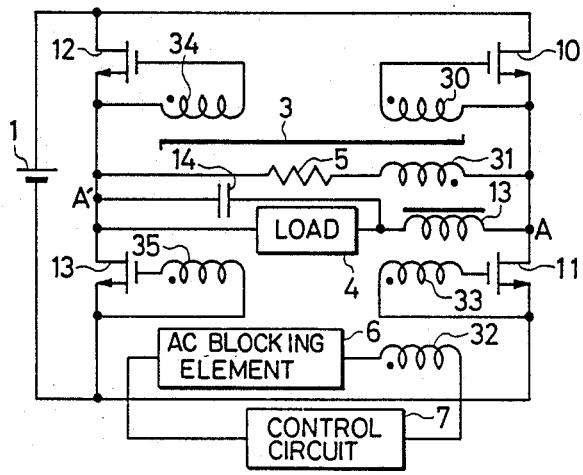
FIGS. 4 through 6 are the circuit diagram showing other embodiments of this invention.

FIG. 4 is a circuit diagram showing another embodiment of this invention. For simplicity of explanation, FIG. 1 shows an example in which half-bridge complementary FETs are used as FET 10 and FET 11 and the drive windings connected between the gates and sources of these FETs are used in common for both FETs.

On the other hand, four full-bridge FETs (10 through 13) are used in FIG. 4. The drive winding of each FET is wound around the core 3 independently of each other and is connected between the gate and source of each FET independently of any other winding or FET, as shown by 30 and 33 through 35 in the figure.

In FIG. 4, pairs of FETs, that is, FETs 10 and 13 and FETs 11 and 12 located on the opposite side of the bridge are so controlled that each FET in a pair is turned on and off simultaneously, and each pair is in an on or off condition opposite that of the other. Other structures in, and operation of, the circuit of FIG. 4 is identical with the embodiment shown in FIG. 1.

Figure 5:
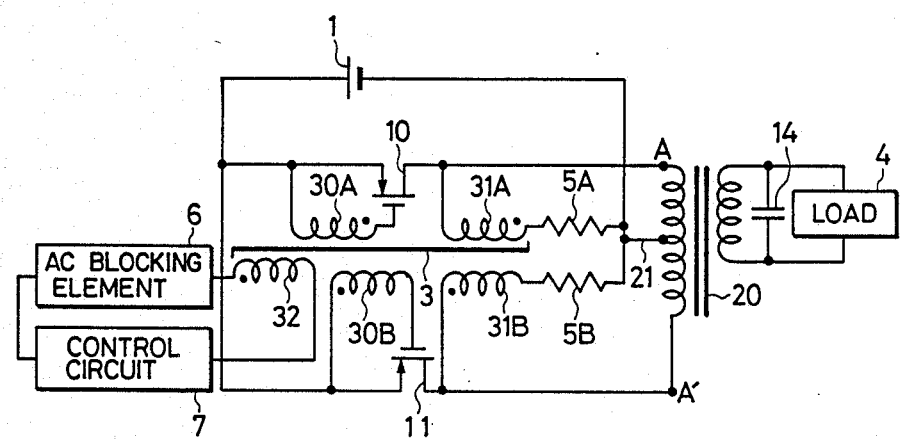

FIG. 5 is a still another embodiment of this invention in which a pair of FETs are connected in a push-pull configuration.

When the FET 10 is turned on, a current flows from the DC power source 1 through the circuit of the FET 10, main winding 31A resistor 5A and back to source 1, and through the circuit of the FET 10, primary winding of the output transformer 20 from the top end at node A out center tap 21 and back to source 1. When FET 11 is turned on, a current flows from the DC power source 1, and back through FET 11 and through both the series circuit of the main winding 31B and resistor 5B, and the lower half of the primary winding of the output transformer 20, in the same manner as mentioned above.

This induces the PWM rectangular voltage wave, detailed earlier, in the secondary winding of the output transformer 20, and this voltage is averaged and applied to the load 4.

Figure 6:
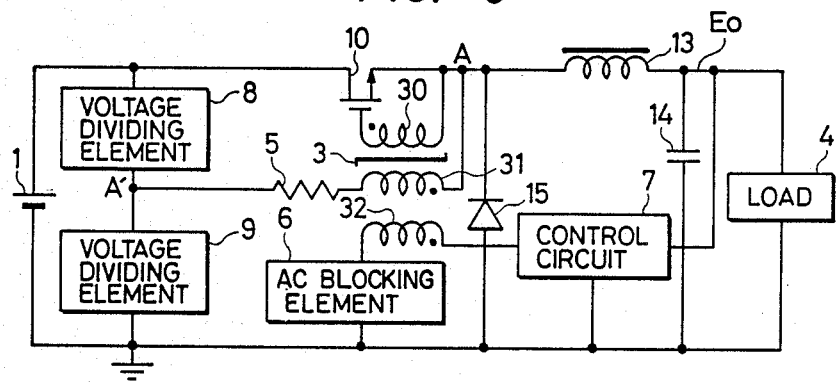

FIG. 6 is still another embodiment in which this invention is applied to a stabilized DC power source. Symbols 8 and 9 denote the elements for dividing the voltage of the DC power source 1 (a pair of resistors or capacitors).

When the FET 10 is turned on, the side marked with a black spot in the main winding 31, that is, node A is energized with a positive voltage of the power source 1 and the other terminal is energized with a voltage of the power source 1 divided by the voltage dividing elements 8 and 9 (voltage at node A') through the resistor 5. In other words, the series circuit of the main winding 31 and resistor 5 is energized with the voltage across the voltage dividing element 8. Since the flywheel diode 15 is in conduction when the FET 10 is turned off, node A on the side marked with a black spot in the winding 31 is at zero potential, and the other node A' is energized with the voltage of the power source 1 divided by the voltage dividing elements 8 and 9 through the resistor 5. Therefore, the main circuit comprising the series circuit of the main winding 31 and resistor 5 is energized with the voltage across the voltage dividing element 9. Thus the main winding 31 is energized with a rectangular wave voltage similar to that shown in FIG. 2-*b* through the resistor 5. As is clear, the flywheel diode shown in FIG. 6 functions as a kind of semiconductor switch element.

When a control current is applied from the control circuit 7 to the control winding 32, there occurs a change in the on-off time ratio of the FET 10 for the same reason as given in reference to FIG. 1 and the voltage at node A becomes a PWM rectangular wave such as shown in FIG. 3-*d*. An output voltage proportional to the aforementioned control current can be obtained across the capacitor 14 by averaging this rectangular voltage wave by the reactor 13 and capacitor 14.

Therefore, a stabilized (DC or AC) output voltage can be obtained across the capacitor 14 by detecting and amplifying the deviation of the output voltage from the reference (DC or AC) voltage and controlling the current to be applied to the control winding 32 based on the amplified deviation signal by the control circuit 7.

For ease of understanding, the above description referred to the application of this invention to the buck type DC-to-DC converter (or stabilized DC power source). It will be easily understood by persons skilled in the art that this invention can also be easily applied to the buck-boost type DC-to-DC power source, boost type DC-to-DC converter, forward type DC-to-DC converter, or others.

As is obvious from the above description, the use of the power source using the saturable core and semiconductor switch according to this invention will make it possible to accomplish switching by a simple device, which has been complex in the conventional power source. Semiconductor switches that can be used include transistors, GTO (gate turn-off thyristor), etc., in addition to the FET mentioned above.

What is claimed is:

1. A PWM inverter having a saturable core, the inverter comprising:

a saturable magnetic material core wound with a main winding and a control winding, a resistor connected to the main winding in series to form a main circuit, a pair of semiconductor switch elements each with a control terminal means and each connected on one side thereof to one end of the main circuit and each also connected on the opposite side thereof to one of a pair of terminal means of which pair the first teminal means is adapted for connection to a first source of voltage and the second terminal means is adapted for connection to a second source of voltage, and with the main circuit also connected on the other end thereof to a third terminal means adapted for connection to a reference source of voltage, a control circuit means which selectively supplies a selected control current to the control winding, and a drive winding wound on the saturable magnetic material core and connected on one end thereof to one side of each semiconductor switch element and on the opposite end thereof to the control terminal of each, wherein the pair of semiconductor switch elements switched on and off alternately as a result of transient oscillation due to the inductance of the aforementioned drive winding after saturation of the saturable magnetic material core and to the capacitance between the control terminal and one side of the semiconductor switch elements so that a voltage results across the main circuit with its polarity inverted alternately which can be pulse-width-modulated by the control circuit current.

2. The PWM inverter in claim 1, wherein a series circuit of a reactor and a capacitor in connected to the main circuit in parallel.

3. The PWM inverter in claim 1, wherein the control current is a current of a substantially constant selected value.

4. The PWM inverter in claim 1, wherein the control current is a current the amplitude of which changes to follow a sinusoidal wave.

5. A PWM inverter having a saturable core, the inverter comprising:

a saturable magnetic material core wound with a main winding and a control winding, a resistor connected to the main winding in series to form a main circuit, first and second semiconductor switch elements each with a control terminal means and each connected on one side thereof to one end of the main circuit and each also connected on the opposite side thereof to one of a pair of terminal means of which pair the first terminal means is adapted for connection to a first source of voltage and the second terminal means is adapted for connection to a second source of voltage, third and fourth semiconductor switch elements each with a control terminal means and each connected on one side thereof to the other end of the main circuit and each also connected on the opposite side thereof between the first and second terminals, a control circuit means which selectively supplies a selected control current to the control winding, and four drive windings each wound on the saturable magnetic material core and each connected to one side of a corresponding one of the semiconductor switch elements and on the opposite end thereof connected to the control terminal of that same semiconductor switch element, wherein the first and third semiconductor switch elements form a first pair and the second and fourth semiconductor switch elements form a second pair with each of the first and second pairs of semiconductor switch elements being switched on and off alternately so that a voltage results across the main circuit with its polarity inverted alternately which can be pulse-width-modulated by the control circuit current.

6. The PWM inverter in claim 5, wherein a series circuit of a reactor and a capacitor is connected to the main circuit in parallel.

7. A PWM inverter having a saturable core, the inverter comprising:

a saturable magnetic material core wound with a main winding and a control winding, a resistor connected to the main winding in series to form a main circuit, a semiconductor switch element with a control terminal means, having one side thereof connected to one side of a diode and the opposite side thereof connected to a first terminal means adapted for connection to a first source of voltage, the opposite side of the diode being connected to a second terminal means adapted for connection to a second source of voltage, and with the other end of the main circuit being connected to a third terminal means adapted for connection to a reference source of voltage, a control circuit means which selectively supplies a selected control current to the control winding, and a drive winding connected on one end thereof to the side of the semiconductor switch element to which the diode is connected, and connected on the opposite end thereof to the control terminal means of the semiconductor element switch, wherein the diode and the semiconductor switch element switch on and off alternately as a result of transient oscillation current due to the inductance of the drive winding after saturation of the saturable magnetic material core and to the capacitance between the control terminal means and one side of the semiconductor switch element so that a voltage results across the main circuit with its polarity inverted alternately which can be pulse-width-modulated by the control circuit current.

8. The PWM inverter in claim 7, wherein a series circuit of a reactor and a capacitor is connected to the main circuit in parallel.

9. A PWM inverter having a saturable core, the inverter comprising:

a saturable magnetic material core wound with first and second main windings and a control winding, a first resistor connected to the first main winding in series to form a first main circuit and a second resistor connected to the second main winding in series to form a second main circuit with the opposite ends of the first and second resistors connected together to thereby connect the first and second main circuits together at one end thereof and to further connect these joined ends to a first terminal means adapted for connection to a first source of voltage, first and second semiconductor switch elements each with a control terminal means and each connected on one side thereof to a second terminal means adapted for connection to a second source of voltage, and with the opposite side of the first semiconductor switch means being connected to the other end of the first main circuit and the opposite side of the second semiconductor switch means connected to the other end of the second main circuit, a control circuit means which selectively supplies a selected control current to the control winding, and first and second drive windings wound on the saturable magnetic material core with the first end of each of the first and second drive windings connected to the second terminal means, the second end of the first drive winding connected to the the control terminal means of the first semiconductor switch element, and the second end of the second drive winding connected to the control terminal means of the second semiconductor switch element, wherein the first and second semiconductor switch elements switch on and off alternately so that a voltage results across the first main circuit and the second main circuit alternately which can be pulse-width-modulated with respect to each other by the control circuit current.

10. The PWM inverter in claim 9, wherein a connection means connects a series circuit of a reactor and a capacitor effectively in parallel with the first and second main circuits.

11. The PWM inverter in claim 9, wherein the joined ends of the first and second main windings are also connected to a tap of a transformer primary winding connected to one of the other ends of the first and second main windings.

* * * * *